United States Patent [19]
Rointru et al.

[11] Patent Number: 6,159,120
[45] Date of Patent: Dec. 12, 2000

[54] BELT TENSIONER AN ENGINE INCLUDING SUCH A TENSIONER AND A METHOD OF MOUNTING SUCH A TENSIONER

[75] Inventors: Claude Rointru, Maziere de Touraine; Patrice Defeings, Montbazon, both of France

[73] Assignee: Hutchinson, Paris, France

[21] Appl. No.: 09/206,264

[22] Filed: Dec. 7, 1998

[30] Foreign Application Priority Data

Dec. 18, 1997 [FR] France ................................. 97 16078

[51] Int. Cl.⁷ ............................................. F16H 7/12
[52] U.S. Cl. ................................... 474/138; 474/110
[58] Field of Search ............................... 474/101, 109, 474/110, 111, 115, 117, 135, 138; 180/53.8; 123/198 R; 267/169, 33, 140.2, 170

[56] References Cited

U.S. PATENT DOCUMENTS

| | | | |
|---|---|---|---|
| 1,374,643 | 4/1921 | Fischbach | 474/138 |
| 4,411,638 | 10/1983 | Wilson | 474/138 |
| 4,466,803 | 8/1984 | Wilson | 474/138 |
| 4,509,935 | 4/1985 | Foster et al. | 474/138 |
| 4,696,664 | 9/1987 | Wilson | 474/138 |
| 4,767,385 | 8/1988 | Wilson | 474/138 |
| 4,790,801 | 12/1988 | Schmidt et al. | 474/110 |
| 4,976,660 | 12/1990 | Breindl | 474/110 |
| 5,026,330 | 6/1991 | Zermati et al. | 474/110 |
| 5,120,277 | 6/1992 | Georget et al. | 474/138 |
| 5,405,298 | 4/1995 | Bristot | 474/136 |
| 5,820,114 | 10/1998 | Tsai | 267/202 |
| 5,851,058 | 12/1998 | Humbek et al. | 305/146 |
| 5,967,923 | 10/1999 | Petri | 474/138 |

FOREIGN PATENT DOCUMENTS

| | | |
|---|---|---|
| 0 113 685 | 7/1984 | European Pat. Off. . |
| 0 560 685 | 9/1993 | European Pat. Off. . |

*Primary Examiner*—Thomas R. Hannon
*Attorney, Agent, or Firm*—Morgan, Lewis & Bockius LLP

[57] ABSTRACT

A tensioner, an engine fitted with such a tensioner, and a method of mounting such a tensioner. The linear tensioner having both a first end fixed to an engine without any degree of freedom, typically via a fixing endpiece having two parallel fixing openings, and also a second end opposite to the first end, and adapted for bearing against the belt, typically being constituted by a skid, a pulley, or preferably, a wheel. The first end and the second end are connected together by a resilient body, typically a coil spring, advantageously associated with a damper, typically hydraulic and/or elastomer, and also possibly adapted for guiding the two ends of the tensioner in relative translation. The present invention applies mainly to the automobile industry.

17 Claims, 3 Drawing Sheets

BELT TENSIONER AN ENGINE INCLUDING SUCH A TENSIONER AND A METHOD OF MOUNTING SUCH A TENSIONER

The present invention relates to a tensioner, to an engine fitted with such a tensioner, and to a method of mounting such a tensioner.

BACKGROUND OF THE INVENTION

Internal combustion engines generally have transmission belts which are tensioned by tensioners comprising a plate mounted to rotate about an axis secured to the engine. Although such tensioners generally give satisfaction, they are bulky and expensive.

OBJECTS AND SUMMARY OF THE INVENTION

Consequently, an object of the present invention is to provide a tensioner that is compact, i.e. a tensioner that occupies a limited amount of space in the engine compartment and that occupies a small storage volume prior to being mounted.

Another object of the present invention is to provide a tensioner that is particularly reliable.

Another object of the present invention is to provide a tensioner that is easy to mount in the engine compartment.

Another object of the present invention is to provide such a tensioner at low cost.

These objects are achieved by a linear tensioner of the present invention having a first end which includes means for fixing on an engine without any degree of freedom, typically via a fixing endpiece having two parallel fixing openings, and a second end opposite to said first end and provided with bearing means for bearing against a belt (typically a skid, a pulley, or preferably a wheel).

The fixing means and the bearing means are interconnected by a resilient body (typically a coil spring) advantageously associated with damper means (typically hydraulic and/or made of elastomer) together with optional means for providing guidance in relative translation between the two ends of the tensioner.

The invention relates mainly to a tensioner for a belt, wherein said tensioner is a linear tensioner having an axis with a first end including means for securing the tensioner to a fixed support and a second end which is opposite to said first end along the axis of the tensioner and which is provided with bearing means for bearing against the belt, the two ends of the tensioner being interconnected by an elastomer body.

The invention also provides a tensioner that includes guide means for guiding its two ends in relative translation.

The invention also provides a tensioner, wherein the first end includes a fixing endpiece fitted with two openings for receiving fixing means for fixing it to the support.

The invention also provides a tensioner, wherein the two openings are parallel to each other and substantially orthogonal to the axis of the tensioner, said openings being adapted to receive fixing bolts.

The invention also provides a tensioner, wherein the bearing means for bearing against the belt comprise a wheel.

The invention also provides a tensioner, wherein the axis of the tensioner corresponds substantially to the bisector of the angle $\alpha$ formed by the belt at the points where it is tangential to the bearing means, in particular to the wheel.

The invention also provides a tensioner that operates in compression.

The invention also provides a tensioner, wherein the resilient body interconnecting the two ends of the tensioner comprises a helical spring.

The invention also provides a tensioner that includes damping means.

The invention also provides a tensioner, wherein the means interconnecting the two ends of the tensioner include a piston and cylinder assembly.

The invention also provides a tensioner that includes prestress-applying means suitable for being released after the tensioner has been mounted.

The invention also provides a tensioner, wherein the means for applying prestress to the resilient body comprise rods suitable for being fixed to the two ends of the tensioner and a plate extending between the rods at the two ends of the tensioner, withdrawal of the plate causing the two ends for the tensioner to be released.

The invention also provides an internal combustion engine that includes at least one belt provided with a tensioner.

The invention also provides an engine, wherein the belt is a transmission belt driven by a pulley secured to the crankshaft of the engine.

The invention also provides a engine, wherein the axis of the tensioner corresponds substantially to the bisector of the angle $\alpha$ formed by the belt where it is tangential to the wheel.

The invention also provides a method of mounting a tensioner on an engine, the method comprising steps consisting in:

a) securing a first end of the tensioner to a support, in particular the case of an engine; and b) applying a wheel against a belt.

The invention also provides a method, further comprising a step consisting in releasing the prestress means so as to apply desired mechanical tension to the belt.

The invention also provides a method, wherein, in step a), the first end of the tensioner is fixed in such a manner as to bring the axis of the tensioner substantially into alignment with the bisector of the angle $\alpha$ formed by the belt where it is tangential to the wheel.

The invention also provides a method, wherein, in step a), the bolts are put into place without being tightened in tapped holes in the support through slots in a fixing endpiece, the tensioner is put into the position corresponding to the desired mechanical tension for the belt, and the bolts are tightened while the tensioner in this position.

BRIEF DESCRIPTION OF THE DRAWINGS

The present invention will be better understood from the following description and from the accompanying figures which are given as non-limiting examples, and in which.

MORE DETAILED DESCRIPTION

In FIGS. 1 to 4, the same references are used to designate the same elements.

Figure 2:
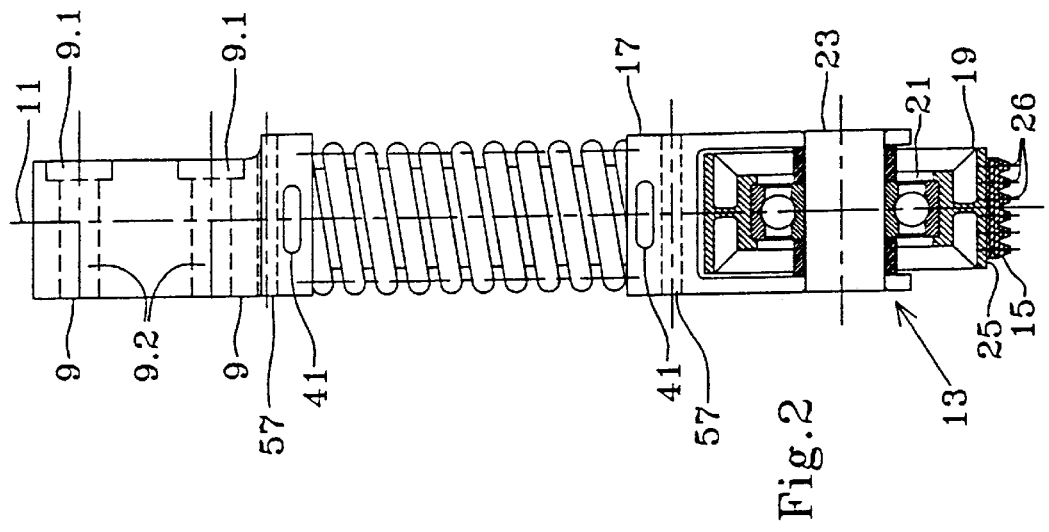
FIG. 2 is a longitudinal view of the FIG. 1 tensioner seen orthogonally to the view of FIG. 1, and shown in section through the wheel for applying force to the belt, the tensioner being in a non-compressed condition.
Figure 1:
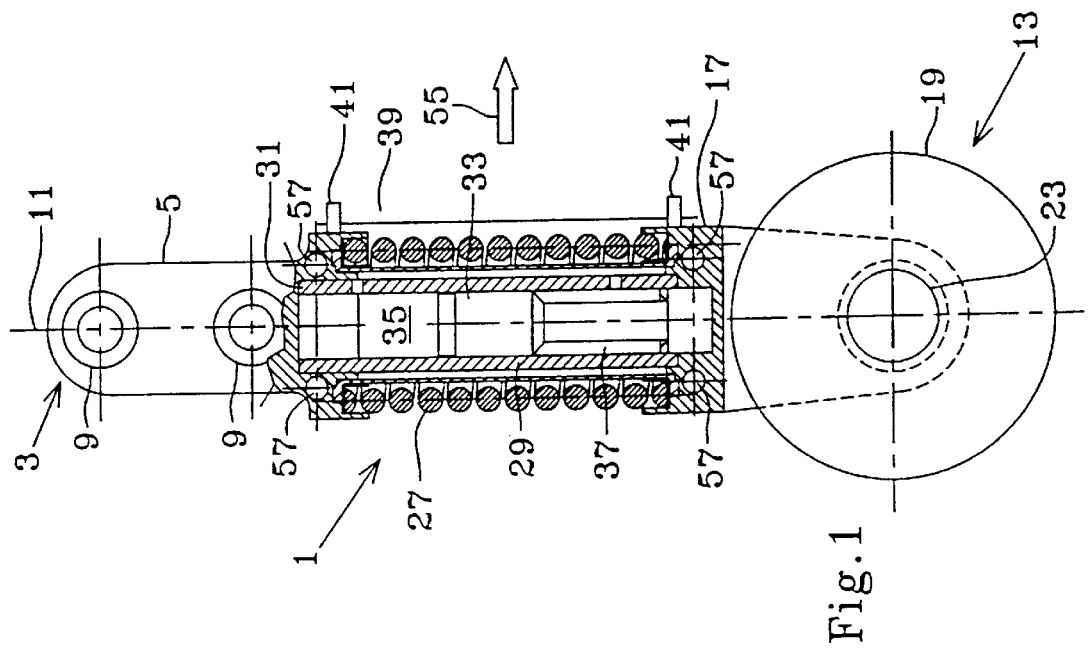
FIG. 1 is a partially cutaway longitudinal section view of a preferred embodiment of the tensioner of the present invention in a compressed condition.
Figure 3:
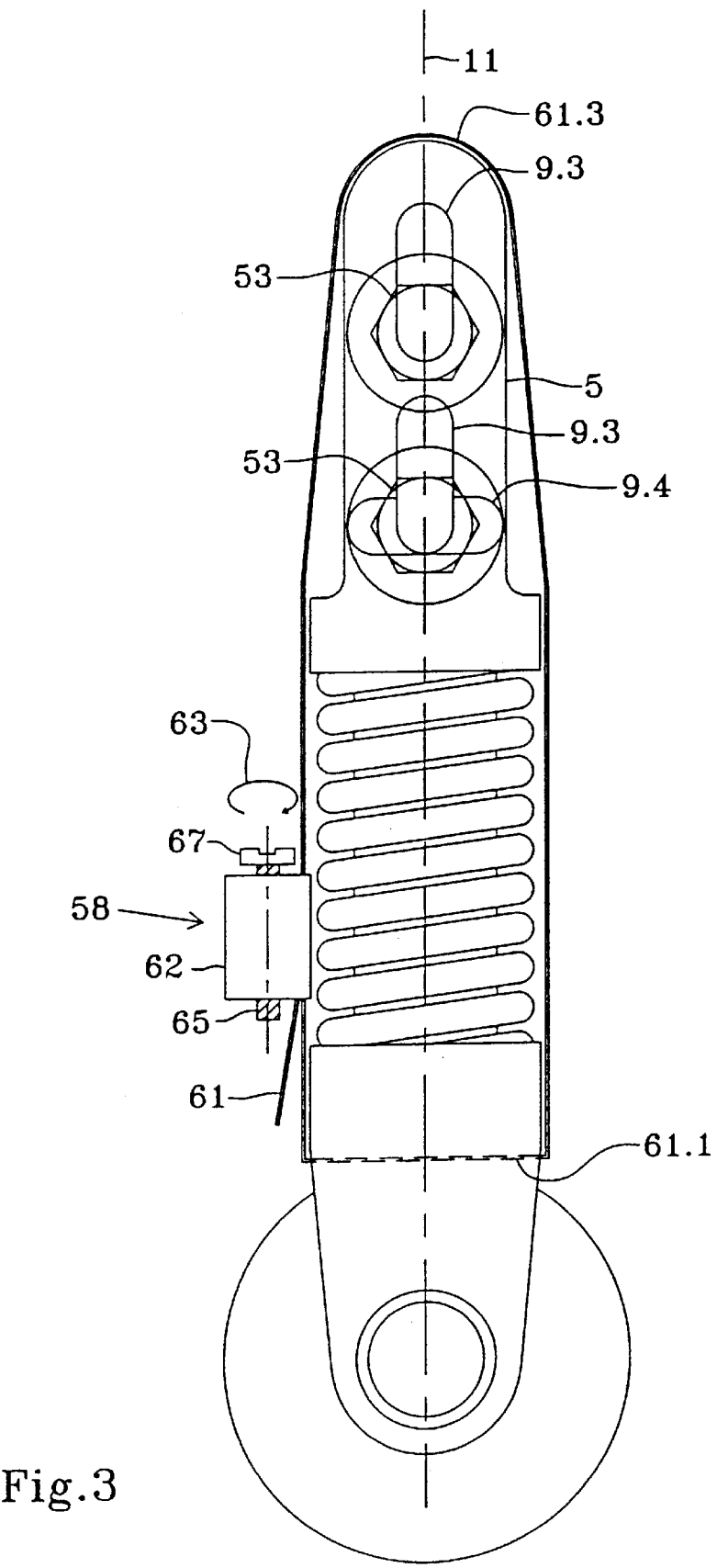
FIG. 3 is a side view of a variant embodiment of the tensioner of the invention.

In FIGS. 1 to 3, there can be seen a linear tensioner 1 of the present invention provided at a first end 3 with a fixing endpiece 5 having means for being secured to a support 7, typically the case of an engine. The term "secured" is used to mean that the tensioner is prevented from moving both axially and angularly (0° of freedom).

In the preferred embodiment as illustrated, the fixing endpiece 5 has two mutually parallel longitudinal openings 9 disposed orthogonally to an axis 11 of the tensioner, each opening being suitable for receiving a fixing bolt 53.

Each opening 9 has a cylindrical segment 9.1 of diameter sufficient to receive at least a portion of the head of a bolt 53, and a second segment 9.2 of smaller diameter extending therefrom so as to receive the shank of the bolt.

It may be advantageous to be able to fit the same tensioner to a plurality of engines, or to be able to vary the position of the tensioner 1 of the present invention relative to the support 7. The fixing endpiece 5 of the FIG. 3 tensioner has slots 9.3 that are elongate on the axis 11 so that it is possible, before tightening the bolts 53, to move the tensioner 1 in translation parallel to the axis 11 until it is in the ideal position. Furthermore, this adjustment makes it possible to accommodate manufacturing tolerances in the belt 15 and manufacturing tolerances in the accessories, in particular variations in the diameters of the driving and driven pulley wheels, or in the positions of the holes for fixing to the support 7, and the like. After the bolts 53 have been tightened, the fixing endpiece 5 is secured to its support 7, but a fork 17 is capable of moving in such a manner as to put the belt under tension, taking up relative variations in the length of the belt 15 under the effects of wear, temperature, and power being taken off by the accessories which are driven by the belt.

In a variant, it may be advantageous to be able to incline the axis 11 of the tensioner 1 of the present invention relative to the support 7. An angular slot 9.4 makes it possible to turn the fixing endpiece 5 through a limited angle relative to the support 7. The angular slot 9.4 may be associated with an opening 9, or, as shown, with a linear slot 9.3.

In a variant, it is possible to use a fixing endpiece 5 that is in the form of a bracket having two mutually-parallel bolt-receiving openings 9 that are orthogonal to the axis 11 and in alignment on an axis that is inclined, or advantageously orthogonal, relative to the axis 11.

Naturally, the bolts 53 can be replaced by any known type of fixing means.

By using two offset bolts, it is possible to secure the tensioner of the present invention to the case 7 of the engine. A second end 13 of the tensioner 1 of the present invention has bearing means that match the belt 15 whose tension it is to adjust.

In the preferred example as shown, the end 13 has a fork 17 provided with a wheel 19 that is advantageously mounted on a ball bearing type bearing 21 to rotate about the axis 23.

The running surface 25 of the wheel 19 is adapted to the belt 15. In the example shown, the belt 15 has a main face provided with longitudinal teeth 26 while the opposite face of the belt against which the wheel 19 bears is smooth. Nevertheless, it would not go beyond the ambit of the present invention to use wheels that have notches, grooves, or other longitudinal guide elements for the belt and matching the shape of the face of the belt against which the wheel presses.

The ends 3 and 13 of the tensioner 1 of the present invention are interconnected by known means, for example such as a coil spring 27 having non-touching turns and hydraulic damper means 29 comprising a cylinder 31 provided with a piston 33 defining a first chamber 35 and a second chamber 37 with fluid being capable of flowing between the two chambers via calibrated orifices (not shown) so as to provide hydraulic damping by means of headloss, or damper means including elastomer elements, in particular in the form of elastomer molded over the spring 27, or the like. An example of damper means suitable for being implemented in a tensioner of the invention is described in French patent application FR-A-2 688 565.

It should be observed that the assembly comprising the piston 33 and the cylinder 33 contribute to stiffening the tensioner 1 and to providing axial guidance during relative translation of the ends 3 and 13 of the tensioner.

The ends 3 and 13 and the mechanical link means such as the elements for providing guidance in translation, e.g. of the type comprising a piston 33 and a cylinder 31, and/or the spring 27, are advantageously all in alignment on the axis 11 of the tensioner of the invention. In this way, the fixing endpiece 5 is at the opposite end of the tensioner from the wheel 19 along the axis 11.

Advantageously, the tensioner 1 of the present invention includes means 39 for maintaining the tensioner in the compressed condition as shown in FIG. 1. The maintaining means 39 may comprise, for example, a plate or strip advantageously made of metal and extending between the two ends 3 and 13, and including openings for receiving studs 41 extending orthogonally to the axis 11, and secured to said two ends.

By way of example, the studs 41 may be circular in section, or are preferably rectangular or square in section.

In a variant, the plate 39 includes, close to each of its two ends, respective rods extending normally to the plane of the plate and penetrating into openings 57 formed in the ends 3 and 13. By pulling off the plate, i.e. by withdrawing the rods from the openings 57, the prestress can be released.

It may be advantageous to be able to remove the tensioner 1 of the present invention during maintenance of the engine and to verify that the tensioner is operating properly, to replace it with a new tensioner, and/or to inspect the belt 15 in case it needs replacing. The FIG. 3 tensioner is provided with a compressor device 58 enabling the spring 27 to be compressed, thereby reducing tension in the belt 15 and thus enabling the tensioner 1 and/or the belt 15 to be removed without being damaged and without any risk of the tensioner expanding suddenly in a manner that could injure the mechanic performing the operation.

The device 58 for compressing the spring 27 comprises a tape 61 which is advantageously made of metal and which passes around elements at both ends 3 and 13 of the tensioner 1, together with a mechanism 62 placed on one side of the tensioner 1 and serving to wind in or to pay out the tape 61 under mechanical control 63.

In the advantageous embodiment shown, a clamping collar is used comprising a tape 61 having slots that are regularly spaced apart along the entire length of the tape 61, which slots are parallel to one another and slope relative to its longitudinal sides at an angle equal to the pitch angle of the thread 65 of a wormscrew 67 held in the housing of the mechanism 62.

Such collars are commonly used in particular for holding the ends of garden hoses. A first end of the tape 61 is secured to the mechanism 62 placed on a first side of the tensioner 1.

The tape 61 passes through the base of the fork 17 at 61.1, along the second side of the tensioner 1 opposite to the first side, at 61.2, over the fixing endpiece 5, at 61.3, and returns to the mechanism 62 where the screw 67 meshes with the slots in the tape 61.

The device 58 may optionally be associated with means 39 for keeping the tensioner in the compressed condition. In which case, prior to assembly, the spring 27 is compressed by the device 58.

The tensioner is put in place and is secured to the support 7. Thereafter the spring 27 is relaxed by turning the screw 67 until the tension in the belt 15 balances that of the spring 27. By continuing to rotate the screw 67, the end of the tape 61 is released and the tape is removed from the tensioner.

To remove the tensioner, operations are performed in reverse order, i.e. the device 58 is put into place, the screw 67 is rotated 63 in the opposite direction to that which serves to release the spring 27 until the spring 27 is maximally compressed, and then the bolts 53 are undone.

Naturally, it would not go beyond the ambit of the present invention to implement the compression device 58 with other types of tensioner including a linear resilient body, typically a spring.

Figure 4:
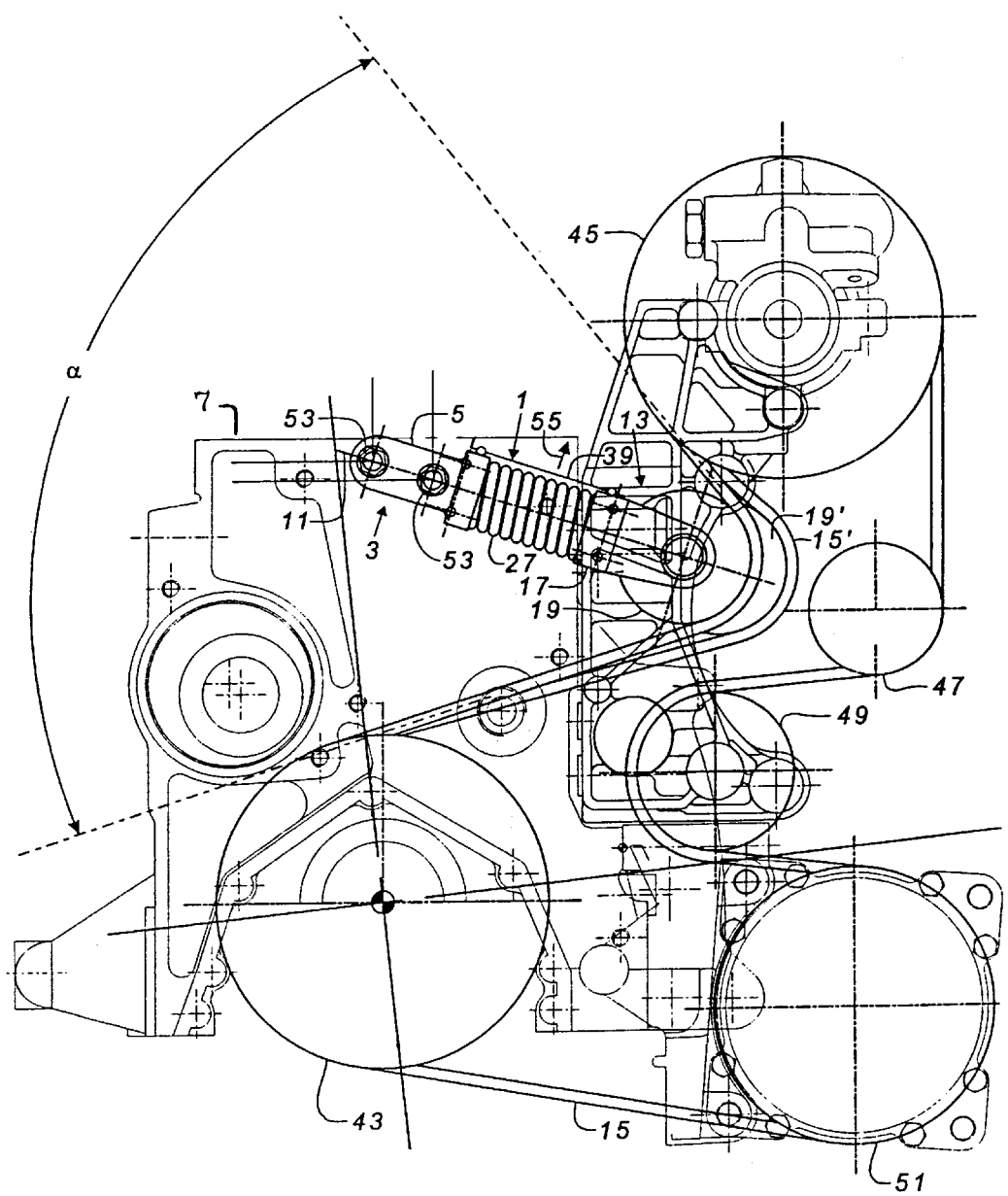
FIG. 4 is an end view of an engine of the present invention including a FIG. 1 tensioner.

In FIG. 4, there can be seen an engine 7 of the present invention that includes a tensioner 1 bearing against a transmission belt 15, advantageously a belt of the type having longitudinal ribs 26 and driven by a pulley 43 secured to the crankshaft of the engine 7 and driving a pulley 45 mounted on the shaft of a power steering device, a pulley 47 mounted on the shaft of an alternator, a deflector wheel 49, and a pulley 51 mounted on the shaft of a compressor. The wheel 19 of a tensioner 1 of the present invention presses against the belt 15.

In the advantageous example shown, the tensioner 1 works in compression, with the fixing endpiece 5 being secured to the engine 7 via bolts 53 received in the openings 9.

Advantageously, the axis 11 of the tensioner 1 corresponds substantially to the bisector of the angle α formed by the belt 15 where it is tangential to the wheel 19, the spring 27 being compressed, or on the contrary, the spring 27 being released of its prestress.

Advantageously, the tensioner 1 is mounted while in a compressed condition. Once the tensioner is in place, the bolts 53 tightened, and the wheel 19 pressed against the belt 15, then the prestress means 39 are released, e.g. by applying traction in the direction of arrow 55 on the plate of the means 39, with withdrawal of the plate releasing the spring 27 so that the ends 3 and 13 of the tensioner move apart.

In FIG. 4, the wheel and the belt corresponding to the working position after the plate of the means 39 has been withdrawn are given respective references 19' and 15'.

Naturally, the prestress means 39 could be implemented with other types of tensioner, and in particular with tensioners having a plate mounted rotatably about an axis secured to the engine 7.

The tensioner having only a spring 27 is of particularly moderate cost, whereas a tensioner which further includes damping means provides high performance.

Naturally, it does not go beyond the ambit of the present invention to implement a linear tensioner 1 that operates in traction, in particular a tensioner having a coil spring 27 with touching turns.

The present invention applies mainly to the automobile industry.

What is claimed is:

1. A tensioner for a belt, wherein said tensioner is a linear tensioner having an axis with a first end including means for securing the tensioner to a fixed support and a second end which is opposite to said first end along the axis of the tensioner and which is provided with bearing means for bearing against the belt, the two ends of the tensioner being interconnected by an elastomer body, said tensioner further including prestress applying means for placing the tensioner in a compressed condition for the mounting of a belt, said prestress applying means comprising a releasable device to release the prestress applying means after the belt has been mounted.

2. A tensioner according to claim 1, including guide means for guiding said two ends in relative translation.

3. A tensioner according to claim 2, wherein the first end includes a fixing endpiece fitted with two openings for receiving fixing means for fixing the first end to the support.

4. A tensioner according to claim 3, wherein the two openings are parallel to each other and substantially orthogonal to the axis of the tensioner, said openings being adapted to receive fixing bolts.

5. A tensioner according to claim 1, wherein the bearing means for bearing against the belt comprises a wheel.

6. A tensioner according to claim 5, wherein the axis of the tensioner corresponds substantially to the bisector of the angle (α) formed by the belt at the points where the belt is tangential to the bearing means.

7. A tensioner according to claim 1, wherein said elastoner body is operating in compression.

8. A tensioner according to claim 1, wherein a resilient body interconnects the two ends of the tensioner, said resilient body comprising a helical spring.

9. A tensioner according to claim 1, including damping means interconnecting said first end and said second end for damping said tensioner.

10. A tensioner according to claim 1, wherein the two ends of the tensioner are interconnected by a piston and cylinder assembly.

11. A tensioner according to claim 1, wherein the means for applying prestress to the tensioner comprises rods suitable for being fixed to the two ends of the tensioner and a plate extending between the rods at the two ends of the tensioner, withdrawal of the plate causing the two ends for the tensioner to be released.

12. An internal combustion engine fitted with at least one belt and fitted with a tensioner according to claim 1.

13. An engine according to claim 12, further comprising a crankshaft wherein the belt is a transmission belt driven by a pulley secured to said crankshaft.

14. An engine according to claim 12, wherein the axis of the tensioner corresponds substantially to the bisector of the angle ( ) formed by the belt where the belt is tangential to said bearing means, and said bearing means comprises a wheel.

15. A method of mounting a tensioner according to claim 1 on an engine, the method comprising the steps of:

a) securing a first end of the tensioner to a support, wherein said support comprises the case of an engine; and b) applying the bearing means against the belt, wherein said bearing means comprises a wheel; and c) releasing the prestress applying means so as to apply a desired mechanical tension to the belt.

16. A method according to claim 15, wherein, in step a), the first end of the tensioner is fixed in such a manner as to bring the axis of the tensioner substantially into alignment with the bisector of the angle (α) formed by the belt where the belt is tangential to the wheel.

17. A method according to claim 15, wherein, in step a), bolts are put into place without being tightened in tapped holes in the support through slots in a fixing endpiece, the tensioner is put into the position is corresponding to a desired mechanical tension for the belt, and the bolts are tightened while the tensioner is in said position.

* * * * *